US006382000B1

(12) United States Patent
Horton

(10) Patent No.: US 6,382,000 B1
(45) Date of Patent: May 7, 2002

(54) VEHICLE ANTI-THEFT SYSTEM

(76) Inventor: Sherie A. Horton, 1262 Cedarcroft Rd., Baltimore, MD (US) 21239

(*) Notice: Subject to any disclaimer, the term of this patent is extended or adjusted under 35 U.S.C. 154(b) by 0 days.

(21) Appl. No.: 09/696,267

(22) Filed: Oct. 26, 2000

(51) Int. Cl.[7] .................................................. B60R 25/06
(52) U.S. Cl. .......................... 70/163; 70/202; 70/203; 70/246; 70/247; 70/DIG. 58
(58) Field of Search .................... 70/DIG. 58, 202, 70/203, 211, 212, 232, 428, 455, 246, 247, 163, 164

(56) References Cited

U.S. PATENT DOCUMENTS

| 220,117 | A | | 9/1879 | Belcher et al. | |
|---|---|---|---|---|---|
| 1,815,417 | A | * | 7/1931 | Miller | 70/202 X |
| 2,169,438 | A | * | 8/1939 | Sherman | 70/211 |
| 2,458,002 | A | | 1/1949 | Kaskouras | |
| 2,575,401 | A | * | 11/1951 | Simmons | 70/211 |
| 3,210,972 | A | | 10/1965 | Johnson | 70/211 |
| 3,245,240 | A | | 4/1966 | De Forrest | |
| 3,832,872 | A | * | 9/1974 | Gerlach | 70/232 |
| 4,051,703 | A | * | 10/1977 | Plaiss | 70/211 X |
| 4,493,198 | A | * | 1/1985 | Brown | 70/203 |
| 4,747,279 | A | | 5/1988 | Solow | 70/238 |
| 4,791,795 | A | * | 12/1988 | Burgess et al. | 70/202 |
| 4,825,670 | A | | 5/1989 | Snow | 70/238 |
| 4,831,850 | A | * | 5/1989 | Wong et al. | 70/202 |
| 4,841,756 | A | * | 6/1989 | Curtis | 70/232 |
| 5,020,344 | A | | 6/1991 | Garcia | 70/245 |
| 5,020,390 | A | | 6/1991 | Chang | 70/246 X |
| 5,179,868 | A | | 1/1993 | Thibeault | 10/248 X |
| 5,203,187 | A | * | 4/1993 | Kane | 70/211 X |
| 5,359,868 | A | * | 11/1994 | Villani | 70/164 X |
| 5,375,916 | A | * | 12/1994 | Cook | 70/163 X |
| 5,410,896 | A | | 5/1995 | Gleason | 10/202 |
| 5,488,846 | A | | 2/1996 | Green | 70/247 |
| 5,560,235 | A | * | 10/1996 | Aucoin | 70/163 X |
| 5,735,147 | A | * | 4/1998 | Cattanach et al. | 70/164 |
| 5,899,100 | A | * | 5/1999 | Rundle et al. | 70/164 X |
| 6,161,402 | A | * | 12/2000 | Moore | 70/14 |

FOREIGN PATENT DOCUMENTS

| AU | 151373 | * | 5/1953 | 70/230 |
|---|---|---|---|---|
| FR | 2419846 | * | 11/1979 | 70/202 |
| GB | 2255060 | * | 10/1992 | 70/202 |
| WO | WO87/06897 | * | 11/1987 | 70/247 |

* cited by examiner

Primary Examiner—Lloyd A. Gail
(74) Attorney, Agent, or Firm—Rosenberg, Klein & Lee

(57) ABSTRACT

A vehicle anti-theft system (10, 10', 10") is provided which includes a pair of housing members (12, 12' and 14, 14'), each having a respective cavity (122, 142) into which an upper portion of a vehicle automatic transmission gearshift lever (2, 2') is received. The securement of the housing members (12, 12' and 14, 14') prevents access to a release button (4, 4') carried by the gearshift lever (2, 2'). A lock (16, 16') is provided to releasably lockingly secure one housing member (12, 12') to the other housing member (14, 14').

6 Claims, 4 Drawing Sheets

VEHICLE ANTI-THEFT SYSTEM

BACKGROUND OF THE INVENTION

1. Field of the Invention

This invention directs itself to vehicle anti-theft systems and more particularly, to vehicle anti-theft systems which prevent gearshifting of vehicles with automatic transmissions and thereby the theft of the vehicles. Still further, the present invention is directed to a vehicle anti-theft system wherein the automatic transmission gearshift lever is releasably lockingly enclosed within a housing formed by a pair of housing portions which prevent access to a release button carried by the gearshift lever.

2. Prior Art

Vehicle anti-theft systems which lock a gearshift lever are well known in the art. The best prior art known to Applicant include U.S. Pat. Nos. 5,488,846; 5,410,896; 5,179,868; 5,020,390; 5,020,344; 4,825,670; 4,747,279; 3,245,240; 2,458,002; and, 220,117.

Some prior art systems, such as that shown in U.S. Pat. No. 5,488,846 provide a lock assembly which is operated by a key to move a locking member so as to immobilize the gearshift lever. Such systems must be provided by the new car manufacturer, as the gearshift lever must be adapted to receive the locking member therein. Such systems do not give any indication to a would-be thief that they are employed. A thief must first break into a vehicle to discover that the gearshift lever is locked.

In other systems, such as that disclosed by U.S. Pat. No. 4,825,670, lockable security devices include a shackle which loops around a gearshift lever and is secured to a member which is releasably lockable to a pair of upstanding frame members that are bolted to the vehicle frame or structure. While such systems may be retrofit into existing vehicles, the frame members utilized for the security system are quite unsightly, and not easily moved from one vehicle to another.

In still other systems, such as disclosed by U.S. Pat. Nos. 5,410,896 and 5,020,390, housing structures are provided for encompassing an upper portion of a gearshift lever. However, such systems can be displaced relative to the gearshift lever, which would permit the release button on the gearshift lever to be operated without removal of the housing.

None of the known prior art systems provide a housing having a pair of housing portions that together form a substantially closed cavity for enclosing an upper portion of a vehicle automatic transmission gearshift lever therein, where a pair of shackle members are engaged by a lock cylinder extending into the cavity space. The face of the lock being contiguous the planar surface of a housing portion. While some systems include laterally extending partitions, such do not limit the lateral displacement of the housing sufficiently to prevent the release button being actuated thereby.

SUMMARY OF THE INVENTION

A vehicle anti-theft system for preventing access to an automatic transmission gearshift release button is provided. The anti-theft system includes a housing having a first portion and a second portion together forming a substantially closed cavity for enclosing an upper portion of a vehicle automatic transmission gearshift lever therein. The upper portion of the gearshift lever carries a release button enclosed within the cavity. The anti-theft system further includes a lock coupled to the housing for securing the first portion to the second portion. The lock includes a lock cylinder extending into the substantially closed cavity.

From another aspect, a vehicle anti-theft system is provided which includes a first housing member having a first cavity and a first open side defining an opening to the first cavity. The first cavity includes a pair of shackle members extending from a surface internal to the first cavity through the first open side. The anti-theft system also includes a second housing member having a second cavity and a second open side defining an opening to the second cavity. The first and second housing members are secured together with the first open side of the first housing member being disposed adjacent the second open side of the second housing member, with an upper portion of a vehicle automatic transmission lever disposed therebetween. The first and second cavities together define a gearshift receiving space. The anti-theft system further includes a lock having a lock face disposed contiguous to a planar wall surface of the second housing member and a lock cylinder extending into the second cavity for coupling with the pair of shackle members.

The present invention is also directed to a method of preventing access to an automatic transmission gearshift release button. The method includes the step of providing a housing having a pair of releasably securable portions and a lock for securing one of the portions to the other. The housing has a cavity formed therein and the lock including a lock cylinder extending into the cavity and mounted to one of the housing portions. The other of the housing portions having a pair of shackle members extending therefrom and engageable with the lock cylinder. Next, a portion of a gearshift lever carrying a release button is enclosed within the cavity of the housing with the pair of shackle members straddling the gearshift lever. Then, the pair of portions of the housing are secured together, engaging the pair of shackle members through openings formed in the lock cylinder to prevent unauthorized access to the release button of the gearshift lever.

DESCRIPTION OF THE PREFERRED EMBODIMENTS

Figure 1:
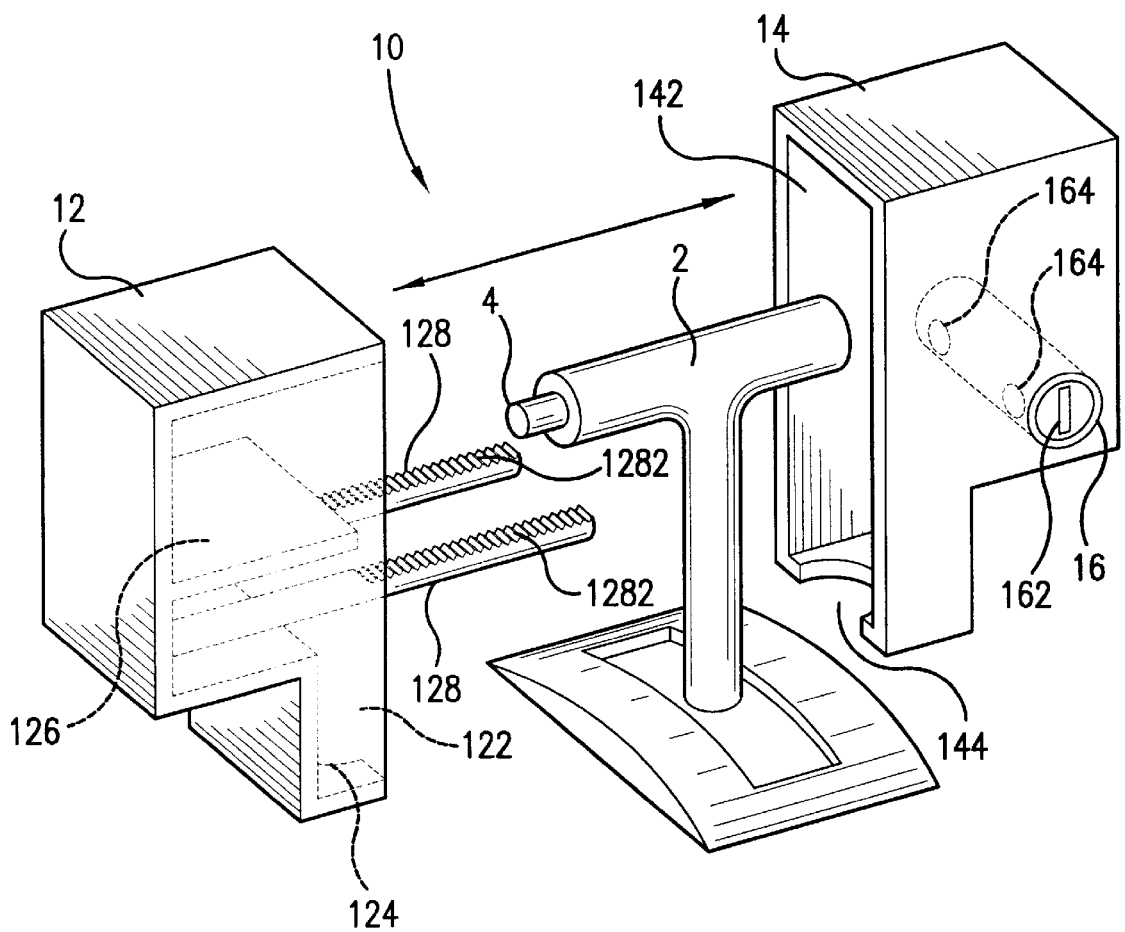
FIG. 1 is an exploded view of the present invention.
Figure 2:
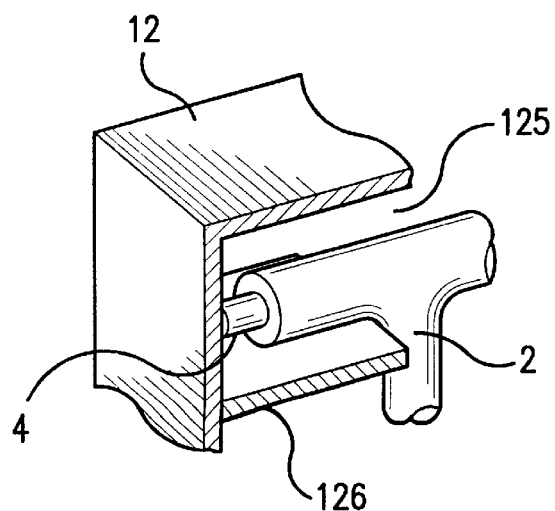
FIG. 2 is an enlarged sectional view of the present invention.

Referring now to FIGS. 1 and 2, there is shown vehicle anti-theft system 10 for preventing access to an automatic transmission gearshift release button of an automobile. As will be seen in following paragraphs, vehicle anti-theft system 10 is specifically directed to the concept of preventing unauthorized persons from displacing an automatic transmission gearshift 2 from the park position by preventing access to the gearshift's release button. Most automatic transmissions in use today require a user to depress a release button 4 in order to displace the gearshift 2 from the park position into reverse, neutral, or forward drive positions thereof. Therefore, by preventing access to the release button 4, unauthorized users are prevented from engaging the transmission, and thus will be unable to cause the vehicle to move. System 10 has the advantage of being portable, allowing a user to transfer the system from one vehicle to another. System 10 also has the advantage that its use is visible to a would be thief, and thereby acts as a deterrent to the car being broken into.

As shown in FIGS. 1 and 2, the vehicle anti-theft system 10 includes a housing formed by two portions, a housing member 12 and a housing member 14. The housing members 12, 14 are designed to accommodate automatic transmission gearshift levers of a wide variety of sizes and styles. The upper end of the gearshift lever may have a T-shape, a ball shape or some other shape. The housing formed by the joining of housing members 12 and 14 substantially encloses the portion of the gearshift lever 2, the portion which carries a release button 4. The release button 4 is utilized to change the position of gearshift lever 2 from the park position to the reverse, neutral or one of several drive positions. With the gearshift lever 2 in the park position, the housing members 12 and 14 are brought together to enclose at least the upper portion of the gearshift lever 2, an open side of each housing member being brought together. Each of the housing members 12 and 14 have a respective cavity 122 and 142 into which portions of the gearshift lever 2 are received. Each of the housing members 12 and 14 include a notch 124 and 144 formed in a bottom wall through which a vertically directed shaft portion of the gearshift lever 2 passes when the two housing members are brought together. The housing formed by the combination of housing members 12 and 14 has a T-shaped contour. While there are some advantages to a housing of that shape, other housing contours, whether they are parallelepiped, substantially cylindrical or spherical, may be used, without departing from the inventive concepts of the anti-theft system disclosed herein.

Within the housing member 12, there may be disposed a laterally extending partition 126 spaced from an upper wall of the housing member. The space between the upper wall and partition 126 defines a cavity portion 125 into which a portion of the gearshift lever 2 is received. The partition 126 prevents access to the release button 4 through the bottom of housing member 12 and limits the lateral displacement of the combined housing members 12 and 14 so that the release button 4 cannot be operated by attempts to displace the system 10 laterally subsequent to its installation. The housing member 14 may also be provided with a similar lateral partition (not shown). The partition 126 extends sufficiently to have a distal end thereof in close proximity to the gearshift lever 2. The proximity of the end of the partition 126 limits lateral displacement of the housing relative to the gearshift lever, preventing actuation of the release button 4 without the housing being removed, which has been a deficiency in prior art devices.

The vehicle anti-theft system 10 also includes a locking mechanism for securing housing member 12 to housing member 14. As shown, the housing member 14 is provided with a lock 16 having a lock face disposed contiguous with a planar wall portion of the housing member 14 and a lock cylinder 162 which extends transversely from a side wall of the housing member into the cavity 142. By that arrangement a more secure locking system is achieved, as the lock is maintained substantially within the housing. In correspondence with the lock cylinder 162, the housing member 12 includes a pair of shackle members 128 extending longitudinally therefrom for engagement with lock cylinder 162 through corresponding openings 164 formed in the lock cylinder 162. Each shackle member 128 is formed with a plurality of teeth 1282 releasably engaged by the lock cylinder when the shackle member 128 is inserted into the opening 164, by means well known in the art.

For maximum securement, the pair of shackle members 128 extend in parallel relationship and straddle the gearshift lever 2, the pair of shackle members 128 extend further to be received within the corresponding openings 164 in lock cylinder 162. Thus, when the housing member 12 is lockingly secured to housing member 14, the gearshift lever 2 is disposed between the two shackle members 128 and the portion of the gearshift lever 2 carrying the release knob 4 is disposed within the cavity portion 125 defined between the partition 126 and an upper wall of the housing member 12. For gearshift levers having a ball-shaped handle with a top mounted release button, the release button carrying portion is not received in the cavity portion 125. The partition 126 still serves to prevent access to the release button from tampering attempts and the overall height of the housing prevents sufficient downward displacement of the housing relative to the gearshift lever to depress the release button.

While the shackle members have been shown to extend from housing member 12, and the lock cylinder disposed in the housing member 14, such is for illustration only. It is not important to the inventive concept as to which housing member the lock 16 is mounted and which is provided with one or more shackle members. Obviously, the lock 16 may be installed in the housing member 12 and the shackle members provided to extend from housing member 14.

Figure 3:
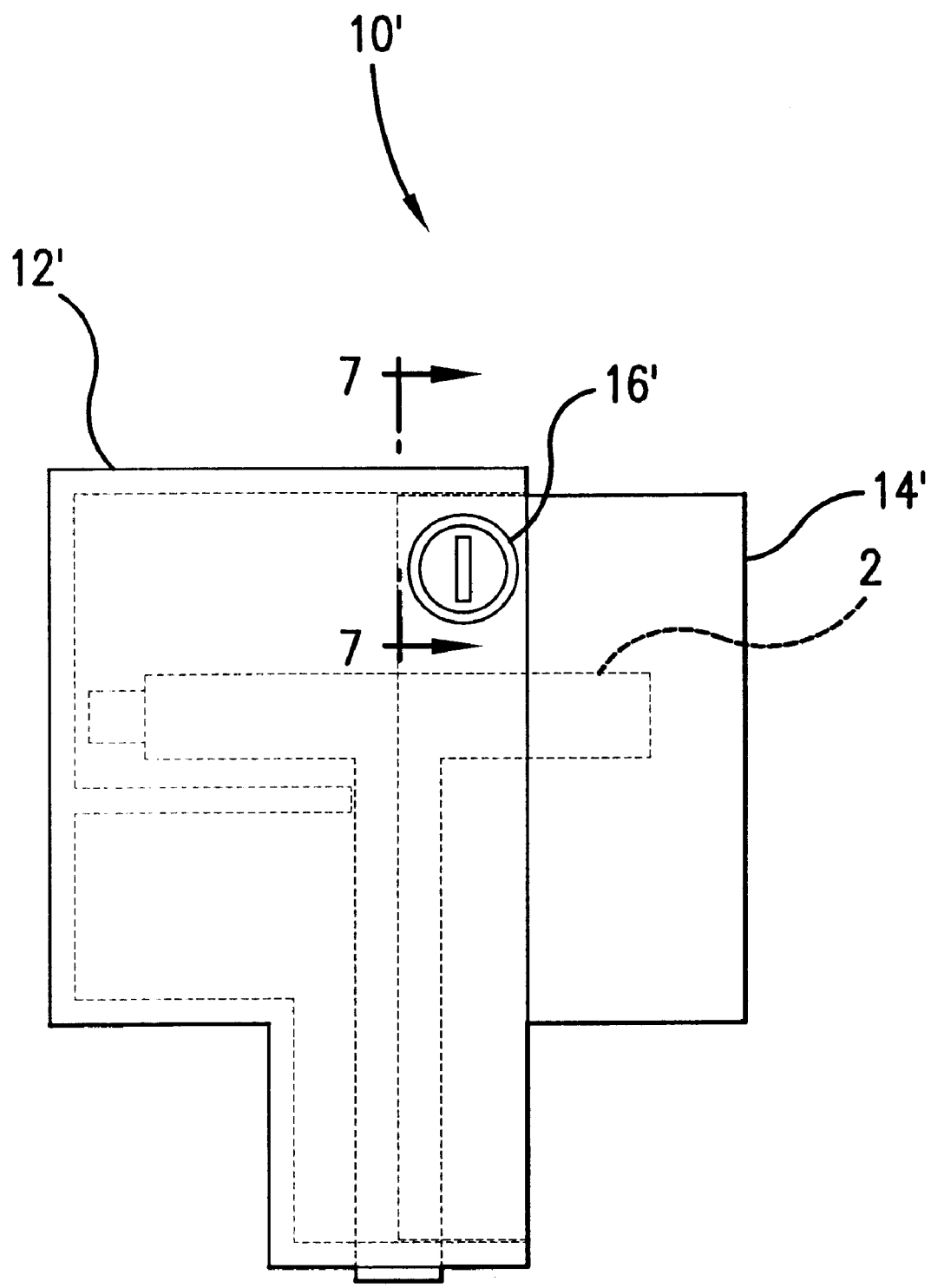
FIG. 3 is an elevation view of a second configuration of the present invention.
Figure 7:
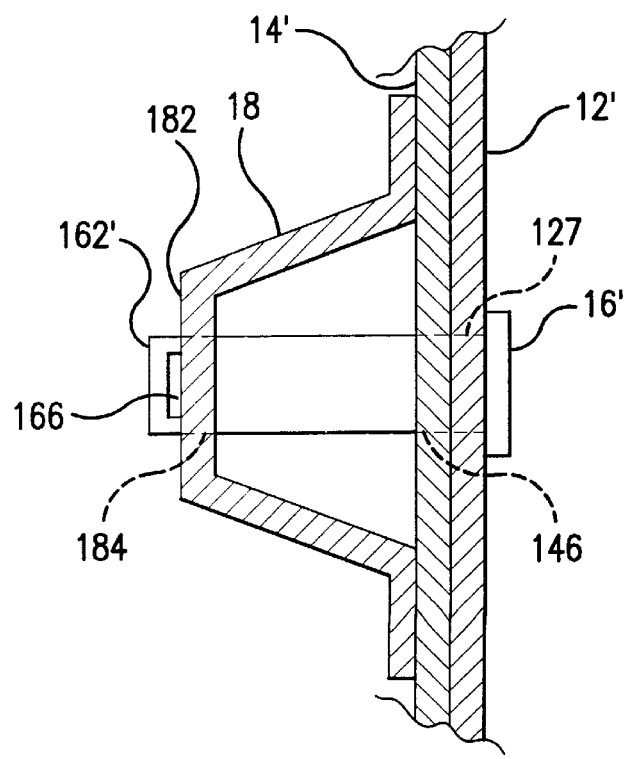

Anti-theft system 10', shown in FIGS. 3 and 7, is another configuration of the multipiece housing for preventing access to an automatic transmission gearshift release button. In this configuration, housing members 12' and 14' are designed to be telescopically engaged, one with respect to the other. Housing member 12' is formed with a through hole 127 and housing member 14' is formed with a through hole 146, the through hole 146 being disposed in aligned relationship with through hole 127 when housing members 12' and 14' enclose a gearshift lever 2. A removable lock 16' is inserted through the aligned openings 127, 146 and extends through an opening 184 formed in a bracket 18 secured to the interior side wall of housing member 14'.

Bracket 18 includes a central portion 182 which is spaced from the interior surface of housing member 14' by a distance designed to accommodate the lock cylinder 162' of lock 16'. Lock 16' is a type well known in the art, where adjacent the rear end of the lock cylinder 162' there is one or more bolt members 166, typically two opposed bolt members, which extend laterally therefrom when the lock is engaged. By that arrangement, retraction of the lock 16' from the openings is prevented, thereby preventing separation of the housing member 12' from the housing member 14'. When the anti-theft system 10' is to be disengaged from the gearshift lever 2, lock 16' is operated so that the one or more bolt members 166 are retracted into the lock cylinder 162', allowing the lock 16' to be withdrawn from the openings 184, 146 and 127. Once the lock 16' is removed, the housing members 12' and 14' are able to be slidingly disengaged one from the other. While system 10' is depicted with housing member 14' being telescopically received within housing member 12', such can be interposed, with the housing member 12' being received in the housing member 14'. In that case, the bracket 18 would be secured to the interior surface of housing member 12'.

Figure 4:
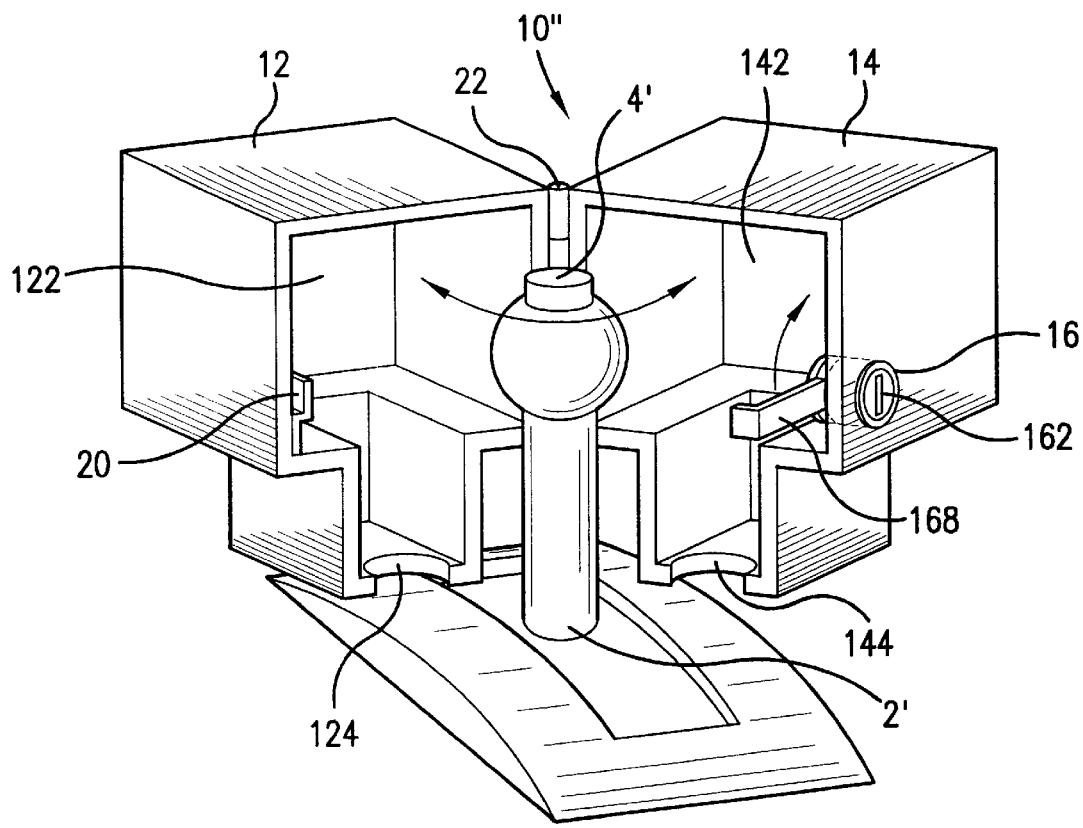
FIG. 4 is a perspective view of a third configuration of the present invention.
Figure 5:
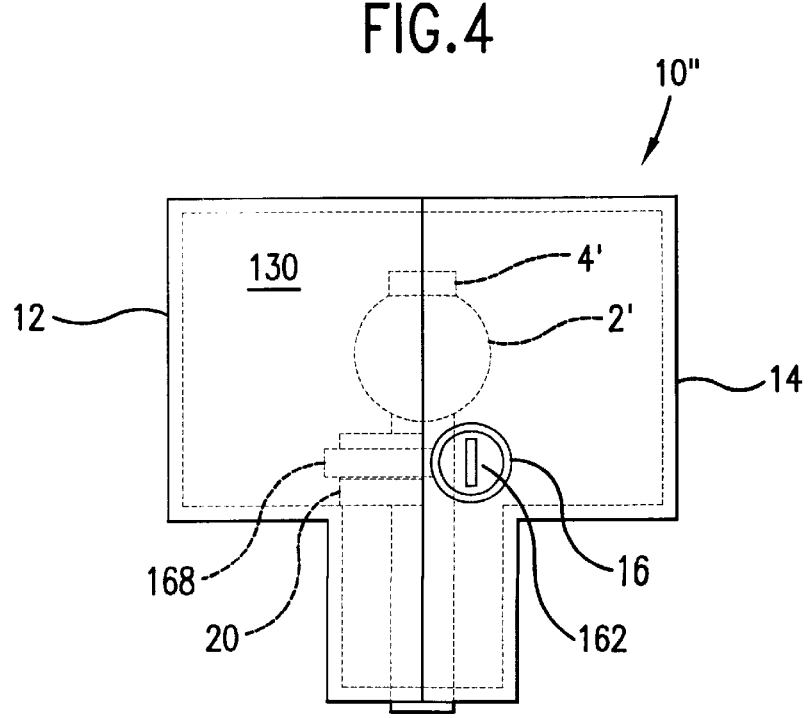
FIG. 5 is an elevation view of the second configuration of the present invention.
Figure 6:
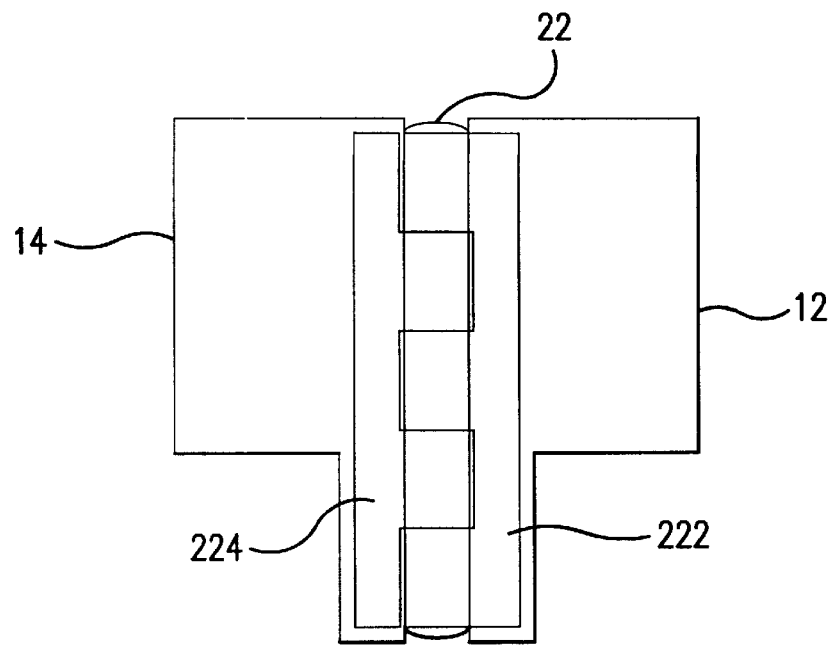
FIG. 6 is a rear elevation view of the third configuration of the present invention; and, FIG. 7 is an enlarged cross-sectional view of the second configuration of the present invention, taken along the section line 7—7 in FIG. 3.

In yet another configuration of the instant invention, vehicle anti-theft system 10" is shown in FIGS. 4–6. In system 10", the housing members 12 and 14 are joined together on one side by a hinge 22, each housing member 12, 14 having a respective cavity 122, 142, which together form a cavity 130 when the gearshift lever 2' is enclosed within the housing. When the housing members 12 and 14 are brought together to enclose the gearshift lever 2', the lower portion of the gearshift lever 2' passes through an opening formed by respective notches 124 and 144 respectively formed in a bottom wall of each of housing members 12 and 14.

A lock 16 is coupled to the housing member 14 and includes a lock cylinder 162 to which a latching member 168 is pivotally coupled. The housing member 12 carries a catch 20 which is engaged by the latching member 168 when the lock is engaged. The latching member 168 has an L-shaped contour and extends longitudinally from the lock cylinder 162 for engagement with the bracket which forms the catch 20, to prevent the pivotal opening of housing members 12 and 14 when the lock is operated. As previously discussed, it is not important to the inventive concept as to which housing member carries the lock 16 and which carries the catch 20, and therefore such may be interposed from that which is shown.

Hinge 22 includes a pair of mounting members 222 and 224, pivotally coupled together and each respectively coupled to a corresponding housing member 12 and 14. Mounting members 222 and 224 may be secured to the respective housing members 12 and 14 by any conventional means, such as riveting, welding, brazing, soldering or the like. Further, it is not beyond the scope of the present invention to form the hinge mounting members 222, 224 integrally, in one-piece formation with a corresponding housing member wall.

In use, the vehicle anti-theft system 10, 10', 10" is provided by a user. The system has a housing having a pair of releasably securable portions 12, 12' and 14, 14' and a lock, 16, 16' to enclose a portion of a gearshift lever 2, 2' which carries a release button 4, 4'. That portion of the gearshift lever is enclosed within the cavity of the housing. The two housing portions 12, 12' and 14, 14' are secured together with a lock 16, 16' to prevent unauthorized access to the release button 4, 4' of the gearshift lever 2, 2'. The lock 16, 16' has a lock face that is disposed contiguous a planar surface of one of the housing portions 12, 12' or 14, 14', and a lock cylinder that extends into the housing cavity. The two housing portions may be brought together with open sides thereof disposed adjacent one another, the open ends disposed in telescopically engaged relationship, or pivotally displaced one with respect to the other so that respective open sides thereof are disposed in substantially contiguous relationship. Where the housing members are pivotally connected, obviously, they must be first pivotally displaced one with respect to the other in a direction to expose the internal cavities 122, 142 of the respective housing portions 12, 14 before positioning the gearshift lever so that it is received within the resulting cavity when the housing portions 12, 14 are pivotally displaced in an opposing direction to enclose the gearshift lever.

Once the housing members 12, 12' and 14, 14' are secured around a vehicle's gearshift lever 2, 2' the release button 4, 4' is no longer accessible, thereby preventing mobilization of the vehicle. The encasement of the gearshift lever 2, 2' by the housing portions is readily visible to any would-be thief and deter that person from breaking into the vehicle. The portability of anti-theft system 10, 10', 10" is another advantage thereof. The interior of each housing member 12, 12' and 14, 14' may be lined with a plastic foam to prevent any marring of the gearshift lever 2, 2'. The housing formed by housing members 12, 12' and 14, 14' is shown to have a T-shaped contour, which aids in limiting tampering through the bottom of the housing. However, other shapes may be employed without departing from the inventive concepts disclosed herein.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or scope of the invention as defined in the appended Claims.

What is being claimed is:

1. A vehicle anti-theft system for preventing access to an automatic transmission gearshift release button, comprising:
   a housing having a first portion and a second portion together forming a substantially closed cavity for enclosing an upper portion of a vehicle automatic transmission gearshift lever therein, the upper portion of the gearshift lever carrying a release button enclosed with said cavity; and,
   a lock coupled to said housing for securing said first portion to said second portion, said lock including a lock cylinder extending into said substantially closed cavity, said lock including a face portion mounted contiguous to a planar surface portion of said second portion of said housing and a pair of shackle members extending from said first portion of said housing and straddling the gearshift lever for releasable locking engagement with said lock cylinder.

2. The vehicle anti-theft system as recited in claim 1 where at least said first portion of said housing includes an upper wall and a partition disposed in said cavity and spaced from said upper wall to (1) define a receiving space into which a portion of the gearshift lever is received and (2) limit lateral displacement of said housing.

3. The vehicle anti-theft system as recited in claim 1 where said pair of shackle members are disposed in parallel relationship and each includes a plurality of teeth, the pair of shackle members being respectively engageable within a corresponding pair of openings formed in said lock cylinder.

4. A method of preventing access to an automatic transmission gearshift release button, comprising the steps of:
   (a) providing a housing having a pair of releasably securable portions and a lock for securing one of said portions to the other, said housing having a cavity formed therein, said lock including a lock cylinder extending into said cavity and mounted to one of said housing portions, the other of said housing portions having a pair of shackle members extending therefrom and engageable with the lock cylinder;
   (b) enclosing a portion of a gearshift lever carrying a release button within said cavity of said housing with said pair of shackle members straddling the gearshift lever; and,
   (c) securing said pair of portions of said housing together, engaging said pair of shackle members through openings formed in said lock cylinder to prevent unauthorized access to the release button of the gearshift lever.

5. A vehicle anti-theft system for preventing access to an automatic transmission gearshift release button, comprising:

a first housing member having a first cavity and a first open side defining an opening to said first cavity, said first cavity including a pair of shackle members extending from a surface internal to said first cavity through said first open side; and, a second housing member having a second cavity and a second open side defining an opening to said second cavity, said first and second housing members being secured together with said first open side being disposed adjacent said second open side with an upper portion of a vehicle automatic transmission lever disposed therebetween, said first and second cavities together defining a gearshift receiving space; and, a lock having a lock face disposed contiguous to a planar wall surface of said second housing member and a lock cylinder extending into said second cavity for coupling with said pair of shackle members.

6. The vehicle anti-theft system as recited in claim 5 where at least said first housing member includes an upper wall and a partition disposed in said first cavity and spaced from said upper wall to define a receiving space into which a laterally extending portion of the gearshift lever is received and prevent lateral displacement of said vehicle anti-theft system relative to the gearshift lever.

* * * * *